United States Patent [19]

Reicks

[11] Patent Number: 4,658,949
[45] Date of Patent: Apr. 21, 1987

[54] CONVEYOR BELT SCRAPER BLADE

[75] Inventor: Allen V. Reicks, Geneseo, Ill.

[73] Assignee: Martin Engineering Company, Neponset, Ill.

[21] Appl. No.: 902,565

[22] Filed: Sep. 2, 1986

[51] Int. Cl.$^4$ .............................................. B65G 45/00
[52] U.S. Cl. ..................................................... 198/497
[58] Field of Search .............. 198/497, 499; 15/256.5, 15/256.51, 256.6

[56] References Cited

U.S. PATENT DOCUMENTS

| 1,957,964 | 5/1934 | Jones | 198/499 X |
| 4,202,437 | 5/1980 | Gordon | 198/497 |
| 4,247,196 | 1/1981 | Ogawa et al. | 15/256.51 X |
| 4,269,301 | 5/1981 | Gibbs | 198/499 |
| 4,489,823 | 12/1984 | Gordon | 198/499 |

Primary Examiner—Joseph E. Valenza
Assistant Examiner—D. Glenn Dayoan
Attorney, Agent, or Firm—Mann, McWilliams, Zummer & Sweeney

[57] ABSTRACT

A scraper blade for use in cleaning conveyor belts, the blade including one or more laterally extending fracture slits provided in the rear face thereof, extending part way between the rear face and front face, the slits forming predetermined fracture lines to ensure fracture and removal of the tip of the scraping edge after wear to a given depth of the blade has taken place.

8 Claims, 6 Drawing Figures

U.S. Patent  Apr. 21, 1987  4,658,949
FIG-1-
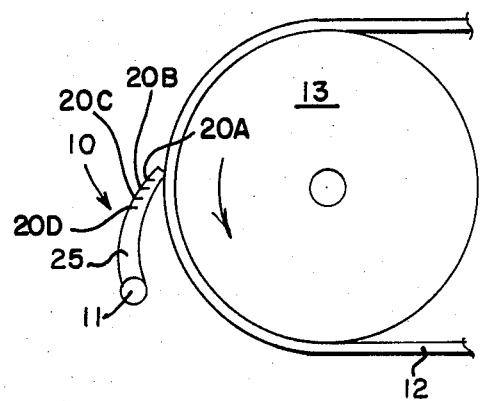
FIG-3-
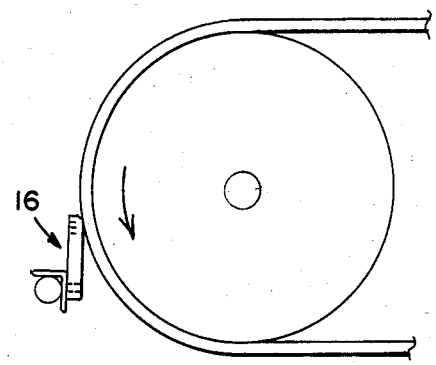
FIG-2-
PRIOR ART
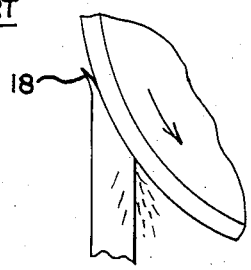
FIG-4-
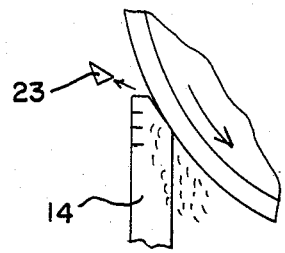
FIG-5-
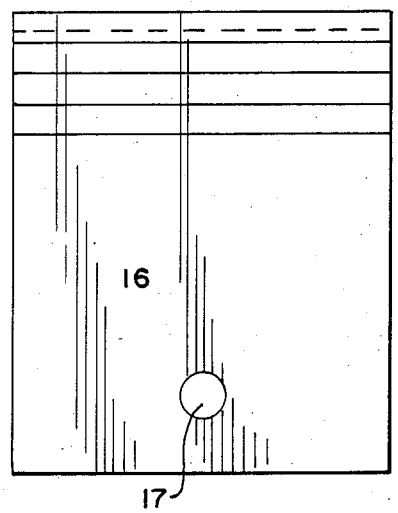
FIG-6-
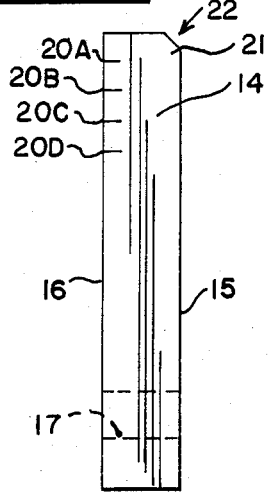

CONVEYOR BELT SCRAPER BLADE

BACKGROUND OF THE INVENTION

The present invention relates to scraper blades which are used to remove residual material clinging to the return run of a conveyor belt. It has been known in the prior art to provide a scraper blade formed of independent rectangular strips of flexible material which are arranged in offset relation to each other which blade varies in height from front to rear. Such an arrangement is shown in U.S. Pat. No. 2,514,780. Other arrangements of flexible belt cleaner blades are shown in U.S. Pat. Nos. 2,759,606, 3,913,728 and 4,202,437. Flexible mounting arrangements shown in U.S. Pat. Nos. 3,288,275 and 3,631,968. Wiper blades which are curved or assume a curvilinear shape in use are shown in U.S. Pat. Nos. 1,957,964, 4,189,046, 4,269,301, 4,489,827 and 4,533,036. None of these prior art arrangements, however, provide a scraper blade which incorporates a structural arrangement designed to initiate fracture of a scraping tip when wear at the scraping edge has passed a certain point.

SUMMARY OF THE INVENTION

The present invention provides a conveyor belt scraper blade which maintains the rigidity of the scraping edge by providing for fracture and removal of the tip after wear of a predetermined magnitude has taken place. Recent studies by the United States Bureau of Mines show that two important variables in consistent conveyor belt cleaning are the contact pressure between the blade and belt, which is a function of blade thickness, and a constant blade angle in relation to the conveyor belt. This result is obtained in the present invention by providing one or more laterally extending fracture slits in the rear face of the base member which slits extend the entire width of the scraper blade and only partially across the depth of the blade from rear surface to front surface. The slits maintain the rigidity of the blade because they are on the compressive side and provide for the thin tip of the scraping edge to break off after a predetermined amount of wear to provide the stiff edge and controlled thickness important for effective cleaning.

DESCRIPTION OF THE DRAWINGS

FIG. 1 is a side view of a conveyor belt and the scraper blade of the present invention in which the scraper blade has a curvilinear configuration.

FIG. 2 is a side view, partially broken away, of a prior art scraper blade showing the wear pattern of the blade after use for a period of time.

FIG. 3 is a side view of a conveyor belt and a scraper blade of the flat configuration shortly after the blade has been placed in use.

FIG. 4 is a side view, partially broken away, showing the wear pattern of the blade of the present invention.

FIG. 5 is an enlarged rear view of the blade illustrated in FIG. 3.

FIG. 6 is an enlarged side view of the blade of FIG. 3 prior to being placed in use.

DESCRIPTION OF THE PREFERRED EMBODIMENT

FIG. 1 shows a conveyor belt cleaning arrangement in which a scraper blade, generally designated as 10, is mounted on a transverse support 11 in scraping engagement with the outer surface of a conveyor belt 12 which is carried around a roller or head pulley 13 mounted at one end of a conveyor. The arrow in FIG. 1 indicates that the roller 13 is rotating in a counterclockwise direction carrying the belt with it.

The scraper blade 10 is shown having a curvilinear configuration with the inner face curved in a direction toward the belt being cleaned. FIGS. 3-6 show an alternative embodiment in which the blade 10 is of a flat rectangular configuration. Referring to the embodiment shown in FIGS. 3-6, the scraper blade includes an upstanding base member 14 with a front face 15 which faces the belt to be cleaned and a rear face 16 which faces away from the belt to be cleaned. The base member 14 defines an aperture 17 extending through it towards its lower end. A bolt and nut (not shown) or some other fastening means is generally used to affix the scraper blade to the transverse support 11.

As best illustrated in FIGS. 5 and 6, one or more fracture slits 20A, 20B, 20C and 20D are provided in the base member extending the entire width thereof. In the preferred embodiment, the base member 14 is formed of polyester based 90 durometer urethane having a depth or thickness of approximately one inch. It has been found that 80 durometer rubber can also be used for the composition of the base member. In FIGS. 5 and 6, four parallel slits 20A-D are illustrated but the actual number of slits which may be utilized in a given environment may be more or less than four depending upon the actual dimensions of the cleaner blade, the wear rate of the blade's composition and other factors relating to the environment in which the belt cleaner operates.

In the embodiment illustrated in the drawings, the slits are oriented so as to be horizontally disposed. The scraper blade of the present invention can also be provided with slits that are disposed at an angle to the horizontal such that the innermost end of each slit is directed toward the central axis of the roller about which the conveyor belt is constrained.

In the embodiment of FIGS. 3-6, the slits extend approximately 5/16 of an inch from the rear surface 16 toward the front surface 15 which is approximately 30-33% of the thickness of the scraper blade. The slits 20 are of zero dimension in height in the preferred embodiment and are spaced approximately ⅜ of an inch apart. The blade has an overall width of 5 inches with a height of 6 inches, and the slits extend the width of the blade. A chamfer 21 of ¼ inch×45° is provided at the upper right in FIG. 6 to form an initial scraping edge 22, the surface of the edge varying as wear takes place.

Although FIGS. 1, 3 and 4 illustrate the scraper blade of the present invention being positioned so as to contact the belt at the return end where the belt is entrained about the pulley 13, the blade can also be positioned below the belt at a location between the head end and the return end. In such an arrangement, the rear face of the blade would be on the compression side, namely, the surface which faces the head end pulley.

FIG. 2 illustrates a typical wear pattern, slightly exaggerated, which takes place during use of prior art scraper blades. As the blade of prior art scapers wears and the blade is adjusted closer to the belt and roller, the shape of the scraping surface conforms itself, by wear, to the shape of the roller. When this happens, the leading edge 18 of the blade becomes thin and floppy resulting in a feathering action and the area of blade material in contact with the belt increases. This hinders effective cleaning of the belt by reducing contact pressure and allows residue to pass between the belt and the blade. The present invention is designed to maintain the rigidity of the scraper blade by providing slits on the compressive side of the blade designed to cause fracture and removal of the scraping tip and renewal of the scraping edge as wear progresses beyond a predetermined limit.

FIG. 4 illustrates the operation of the present invention. The base member 14 illustrated in FIG. 4 represents the scraper of FIG. 6 which has been in use for some time and subjected to wear. As wear of the scraper blade takes place, the blade is adjusted toward the head pulley and belt by the operator so as to maintain contact and effective cleaning. As the blade wears, a triangular tip 23, illustrated in FIG. 4, is formed at the leading portion of the scraping edge 22. When wear approaches the innermost end of the slit 20A, the tip 23 will separate from the blade member 14 and fall off as indicated in FIG. 4. This will prevent the thin and floppy configuration of scraping surface of prior art cleaners as shown in FIG. 2. The blade of FIG. 4, after the tip 23 has fallen off, is of substantially the same configuration as the blade shown in FIG. 6, but slightly shorter in height. With multiple slits 20A, 20B, 20C and 20D, as illustrated in FIGS. 4-6, the process of wear and tip removal continues until no more fracture slits remain in the base member. Generally, this is the point at which the cleaner blade has worn beyond usable limits and must be replaced. Under some circumstances, worn cleaner blades can be remolded to original specifications.

The slits 20 can be provided in a number of ways. One satisfactory method has been to provide cut lines in the urethane block with a sharp knife. This does not require the removal of any material and results in a slit of zero dimension in height. The slits can also be provided by passing the rear face of the base member under a rotary cutter fitted with an appropriate number of cutter wheels. The cutters can be adjusted to provide slits of the required depth. This procedure produces slits having a finite height dimension which close up under blade tension. This allows some deflection of the blade and provides for "torque storage" during wear. The slits illustrated in FIGS. 4 and 6 are shown as being horiziontally disposed and parallel to each other. In some instances, it has been found preferable to orient the slits at an angle to the horizontal in a direction so that the slit lines extend in a direction toward the central axis of the roller.

The embodiment of the invention shown in FIG. 1 utilizes a scraper blade 25 which is inwardly curved. In this configuration, it is desirable to keep the centerline of an angularly torsioned main frame close to the head pulley to provide direct force transmittal as applied tangentially from the blade/pulley interface. Ideally, the central axis of the main frame 11 would lie inside of a line drawn tangent to the belt surface passing through the point of contact between the blade 25 and the belt 12. This provides controllability when tensioning as well as consistent cleaning when the blade wears. It is also desirable to increase the length of a scraper blade so that its effective life is extended while keeping the blade area in contact with the belt to a minimum. A solution to this problem is to provide a curved blade providing a diverging material relief area between the blade and the pulley which would be useful for a wide range of pulley diameters. The curved blade 25 also includes a plurality of slits 20(A-D) on the rear face therof disposed in much the same manner and functioning in substantially the same way as the embodiment illustrated in FIGS. 3-6 and previously described herein.

Thus, it has been shown that the present invention provides a conveyor belt scraper blade which maintains the rigidity of the blade providing a stiff edge of controlled thickness for effective cleaning as wear occurs.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A scraper blade for cleaning conveyor belts including a base member adapted to be attached to a transverse support, said base member having front and rear faces, a scraping edge formed on said base member adapted to contact the conveyor surface to be cleaned, one or more fracture slits defined in said rear face of said base member, adjacent said scraping edge, extending the width of said scraper blade, whereby said slits form predetermined fracture lines to facilitate fracture of a tip of said scraping edge as wear takes place so as to maintain a stiff scraping edge for effective cleaning.

2. A scraper blade as in claim 1 in which said slits extend approximately 30-33% of the distance from said rear face to said front face.

3. A scraper blade as in claim 1 in which a plurality of parallel fracture slits are defined in said base member.

4. A scraper blade as in claim 3 in which said slits are horizontally disposed.

5. A scraper blade as in claim 3 in which said slits are disposed at an angle to the horizontal such that the innermost end of said slit is directed toward the central axis of a roller about which the conveyor belt is constrained.

6. A scraper blade as in claim 3 in which said slits are spaced apart a distance representing approximately 6-7% of the height of said base member.

7. A scraper blade as in claim 1 in which said scraper blade is formed of urethane.

8. A scraper blade as in claim 1 in which said base member is curvilinear in shape, said inner face being curved in a direction toward the belt surface to be cleaned.

* * * * *